United States Patent
Tam

(10) Patent No.: US 10,824,742 B2
(45) Date of Patent: Nov. 3, 2020

(54) METHOD AND SYSTEM FOR MOVING CUSTOMER DATA TO TRUSTED STORAGE

(71) Applicant: MITEL NETWORKS CORPORATION, Ottawa (CA)

(72) Inventor: Terry Tam, Ottawa (CA)

(73) Assignee: Mitel Cloud Services, Inc., Mesa, AZ (US)

( * ) Notice: Subject to any disclaimer, the term of this patent is extended or adjusted under 35 U.S.C. 154(b) by 272 days.

(21) Appl. No.: 15/937,952

(22) Filed: Mar. 28, 2018

(65) Prior Publication Data

US 2019/0303589 A1 Oct. 3, 2019

(51) Int. Cl.
| | |
|---|---|
| *G06F 7/04* | (2006.01) |
| *G06F 21/60* | (2013.01) |
| *H04L 29/08* | (2006.01) |
| *H04L 29/06* | (2006.01) |
| *H04N 7/16* | (2011.01) |
| *G06Q 30/00* | (2012.01) |
| *G06F 21/62* | (2013.01) |

(52) U.S. Cl.
CPC ............ *G06F 21/604* (2013.01); *H04L 63/04* (2013.01); *H04L 67/1097* (2013.01); *G06F 21/6218* (2013.01); *G06Q 30/01* (2013.01); *H04L 67/06* (2013.01)

(58) Field of Classification Search
CPC ... G06F 21/604; G06F 21/6218; H04L 63/00; H04L 67/06; H04L 67/1097; H04L 67/02; H04L 67/10
USPC .......................................................... 726/26
See application file for complete search history.

(56) References Cited

U.S. PATENT DOCUMENTS

| | | | | |
|---|---|---|---|---|
| 9,877,190 | B1* | 1/2018 | Gailloux ................. | H04W 8/20 |
| 2005/0286461 | A1* | 12/2005 | Zhang ................... | H04W 76/11 |
| | | | | 370/328 |
| 2011/0145902 | A1* | 6/2011 | Kim ........................ | H04L 63/10 |
| | | | | 726/7 |
| 2013/0007845 | A1* | 1/2013 | Chang ................... | H04L 63/104 |
| | | | | 726/4 |
| 2013/0246206 | A1* | 9/2013 | Huang .................... | H04L 67/16 |
| | | | | 705/26.1 |
| 2013/0346120 | A1* | 12/2013 | Kurisu ................... | G06Q 10/02 |
| | | | | 705/5 |
| 2014/0006350 | A1* | 1/2014 | Fukui .................... | G06F 16/178 |
| | | | | 707/632 |
| 2014/0074793 | A1* | 3/2014 | Doering ................ | G06F 16/113 |
| | | | | 707/667 |
| 2014/0115042 | A1* | 4/2014 | Yin ........................ | G06Q 50/01 |
| | | | | 709/203 |

(Continued)

OTHER PUBLICATIONS

Han et al, "A Hierarchical Security-Auditing Methodology for Cloud Computing", 2015 IEEE Internanational Conference on Services Computing, IEEE, Jun. 27, 2015, pp. 202-209.

*Primary Examiner* — Gary S Gracia

(57) ABSTRACT

Methods and systems are provided for moving customer data relating to a service from the service to a customer-controlled secure storage upon deletion of a customer account from the service. Exemplary methods and systems are provided for moving the customer data to a location which is under the control or under ownership of the customer in a secure and automated fashion. Additionally, methods and systems are provided for establishing a client/service to service relationship.

13 Claims, 4 Drawing Sheets

(56) References Cited

U.S. PATENT DOCUMENTS

| | | | |
|---|---|---|---|
| 2014/0223576 A1* | 8/2014 | Zhao | H04L 67/10 |
| | | | 726/27 |
| 2015/0271091 A1* | 9/2015 | Maruyama | H04L 47/78 |
| | | | 709/226 |
| 2016/0044035 A1 | 2/2016 | Huang | |
| 2018/0349487 A1* | 12/2018 | Garg | G06F 16/289 |

* cited by examiner

METHOD AND SYSTEM FOR MOVING CUSTOMER DATA TO TRUSTED STORAGE

FIELD

This invention relates generally to computing systems, and more particularly to a method and system for moving customer data relating to a service from the service to a trusted storage under customer control or ownership upon deletion of a customer account from the service.

BACKGROUND

Software as a Service (SaaS) is a cloud-based service delivery method in which collaborative services may be offered via a centrally hosted service provider. SaaS services often require the storage of confidential customer information (e.g. personal information, financial information such as credit card data, etc.) In many jurisdictions, such customer data is subject to data protection legislation such as the Gramm-Leach-Bliley Act in the United States, the UK Data Protection Act, the Swiss Federal Act on Data Protection and the Personal Information Protection and the Electronic Documents Act in Canada. Lack of compliance with such legislation can result in significant fines or even criminal sanctions.

Upon termination of a service (e.g. at the end of a subscription contract), it is important that all customer data be deleted by the service provider in order to comply with data protection legislation, and that control of the data be returned to the customer. Where a centrally hosted service utilizes multiple individual SaaS services, challenges can arise with respect to proper handling of customer data upon termination of the overall service to the customer since the customer data may be stored in multiple locations, none of which are under control of the customer. This can result in the customer being left in a disabled state as result of termination of services, with the customer's data still existing on multiple individual SaaS instances in the cloud. Therefore, even though such a centrally hosted service provider may have appropriate policies for deletion of customer accounts, the service provider may be unable to comply with data protection legislation due to the customer's data still existing in the cloud.

BRIEF DESCRIPTION OF THE DRAWING FIGURES

Subject matter of the present disclosure is particularly pointed out and distinctly claimed in the concluding portion of the specification. A more complete understanding of the present disclosure, however, may best be obtained by referring to the detailed description when considered in connection with the drawing figures.

DETAILED DESCRIPTION

Figure 1:
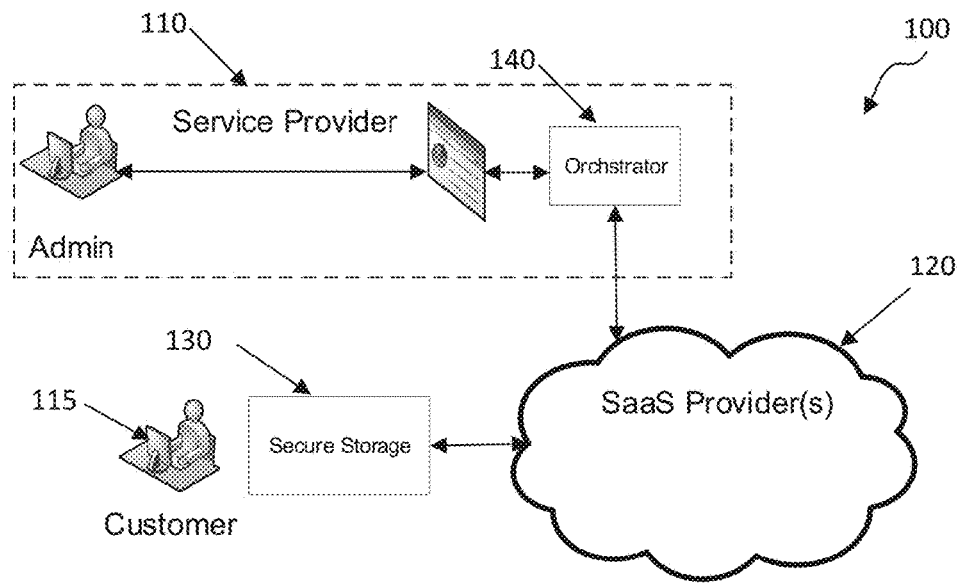
FIG. 1 illustrates a system for providing a centrally hosted service to a customer, including collaborative SaaS service providers, in accordance with exemplary embodiments of the disclosure.

The description of various embodiments of the present disclosure provided below is merely exemplary and is intended for purposes of illustration only; the following description is not intended to limit the scope of an invention disclosed herein. Moreover, recitation of multiple embodiments having stated features is not intended to exclude other embodiments having additional features or other embodiments incorporating different combinations of the stated features.

Exemplary embodiments of the disclosure are described herein in terms of various functional components and various steps. It should be appreciated that such functional components may be realized by any number of hardware or structural components configured to perform the specified functions. Further, it should be noted that while various components may be suitably coupled or connected to other components within exemplary systems, such connections and couplings can be realized by direct connection between components, or by connection through other components and devices located therebetween. Similarly, unless otherwise noted, illustrative methods can include additional steps and/or steps that are performed in a different order.

In accordance with various embodiments of the disclosure, improved methods and systems are disclosed for moving customer data relating to a service from the service provider to a customer-controlled storage upon deletion of a customer account from the service. More particularly, methods and systems are disclosed for moving customer data to a location which is under the control or under ownership of the customer in a secure and automated fashion. Additionally, methods and systems are disclosed for establishing a client/service to service relationship. In this specification, the term "customer" refers to a company/corporation or any end user of a service, "customer data" includes data generated by a customer. Thus, the term "customer data" encompasses data describing or relating to a customer (e.g. personal or financial data) as well as digital content generated by a customer (e.g. images). In one application, where the customer is a small business or single user, the data can belong to the end user and the secure storage can belong to the end user. In another application, where the customer is a larger business, the data can belong to the end user and the secure storage can belong to the company/corporation. In a further application the data can belong to the company/corporation and also the secure storage In one aspect, a customer-controlled storage service is provided to which a service provider moves customer data prior to removing the data from the service provider records on termination of service.

An exemplary method includes a method of moving customer data relating to a service to a secure storage under control of the customer upon termination of the service, the method comprising: exchanging messages between a customer client device and a service provider for registering a trust relationship between the service provider and the secure storage; prior to termination of the service storing said customer data in at least one persistent storage associated with the service provider; and upon termination of the service copying the customer data from said at least one persistent storage to the secure storage and thereafter deleting the customer data from said at least one persistent storage.

An exemplary system includes a system for moving customer data relating to a service to a secure storage upon termination of the service, the system comprising: a service provider and at least one application, service or microservice for receiving said customer data and providing said service, wherein the customer data is distributed between the service provider and said at least one application, service or microservice; a web server for storing said customer data in at least one persistent storage and registering a trust relationship with the customer for accessing the secure storage under control of the customer; and an orchestrator for copying customer data from the at least one persistent storage to the secure storage upon termination of the service and thereafter deleting the customer data from the at least one persistent storage.

Additional aspects include a non-transient computer readable medium containing program instructions for causing a computer to perform the method of: exchanging messages between a customer client device and a service provider for registering a trust relationship between the service provider and customer for accessing a secure storage under control of the customer; prior to termination of the service storing said customer data in at least one persistent storage associated with the service provider; and upon termination of the service copying the customer data from said at least one persistent storage to the secure storage and thereafter deleting the customer data from said at least one persistent storage.

Further aspects include a non-transient computer readable medium containing program instructions for causing a computer to perform the method of: a customer client device transmitting to a service provider an operation message that includes service access details of at least one customer controlled service available to the service provider; and the service provider transmitting to the customer client device an operation response message for indicating one of either success or failure of the operation.

Turning to FIG. 1, a system 100 is shown for providing a centrally hosted service to a customer, who typically interacts with the service via a client device 115, such as a computer, smartphone, IP phone, etc. In the exemplary embodiment of FIG. 1, a service provider 110 provides an overall solution to the customer via at least one application, service and/or microservice, represented herein by Software as a Service (SaaS) cloud service provider 120. A person of skill in the art will understand that a microservice is a variant of the service-oriented architecture (SOA) architectural style that structures an application as a collection of loosely coupled services. Although only one external application server and/or SaaS cloud service provider 120 is shown, it is known in the art that multiple such servers/providers may collaborate to provide an overall customer solution. As discussed above, challenges can arise with respect to compliance with data protection legislation when service to the customer is terminated, particularly when customer data is stored in one or more SaaS cloud service provider 120.

Therefore, as described herein, a method and system are provided for moving customer data relating to a service from the service provider 110 and collaborative SaaS cloud providers 120 to a secure storage 130, under control of an orchestrator 140, upon termination of services to the customer. As used herein, customer data includes data relating to the customer, such as personal or financial information, as well as data generated by the customer using the service (e.g. photos, documents, etc.) Storage 130 can be an encrypted data vault software application, or cloud-based storage, etc., under ownership or control of the customer. Client device 115 may designate multiple storage locations for high availability applications.

Figure 2:
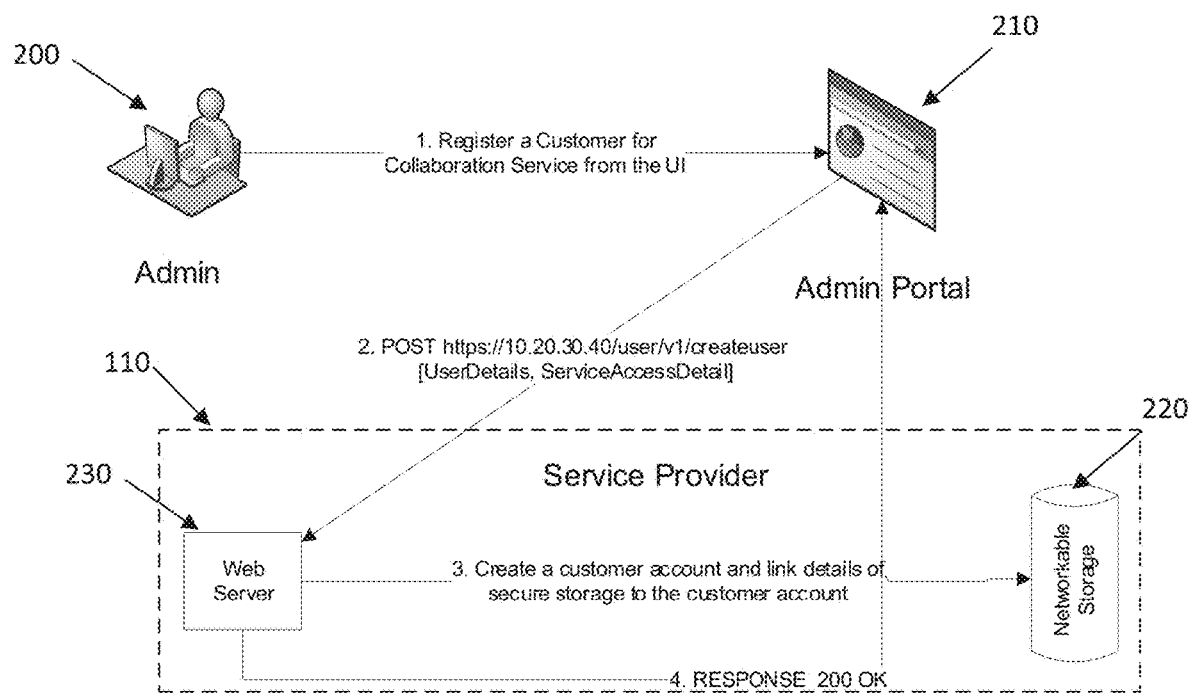
FIG. 2 illustrates a system for providing a registering a customer with the centrally hosted service of FIG. 1 and establishing a trust relationship with a trusted storage in accordance with further exemplary embodiments of the disclosure.

With reference to FIG. 2, to enroll a customer for an overall solution, administrator 200 interacts with the user interface of an administrator portal 210 to register the customer for a host of services under control of orchestrator 140. As discussed above, service can be provided by the service provider 110 itself via an application or in combination with one or more SaaS providers 120 which, as used herein, represents the application, service and/or microservice(s). Also, whereas service registrations as described herein is facilitated by a traditional administrator 200, it is contemplated that the customer may initiate service registration herself by directly accessing the portal 210 and specifying type(s) of service, for example by using a one-time certificate.

As set forth in greater detail below, as part of customer enrolment for service a trust relationship is registered between the service provider 110 and the customer (e.g. via a protocol that supports best security practices including authorization workflows, such as Oauth 2.0). Once the trust relationship is established, further configuration occurs to move or manipulate the data, as described in greater detail below.

In order to create the trust relationship, a client/service to service message exchange takes place between the customer client device 115 (i.e. client in the client-server model) and service provider 110 (i.e. server in the client-server model), as shown in FIG. 3. Typically, with Software as a Service (SaaS) implementations, the service provider 110 offers services to the customer. However, according to an aspect of the exemplary embodiment the customer client device 115 has a service that the service provider 110 needs to facilitate secure transfer of the customer data upon termination of the service. Specifically, the customer client device 115 has a storage service (trusted storage 130) under control of the customer to which the service provider 110 needs to move the customer data prior to removing the data from the service provider 110 on termination of service.

In a typical service-to-service relationship, such SaaS, the client requests services from an endpoint on the service provider (which is listening for requests). However, the typical service-to-service relationship does not contemplate a service provider requesting services of the client. Clients in a SaaS model traditionally do not have endpoints listening for requests. Consequently, in the typical service-to-service relationship, a request from service provider 110 for a service (e.g. access to trusted storage 130) will fail because the client endpoint is not listening for service requests.

Figure 3A:
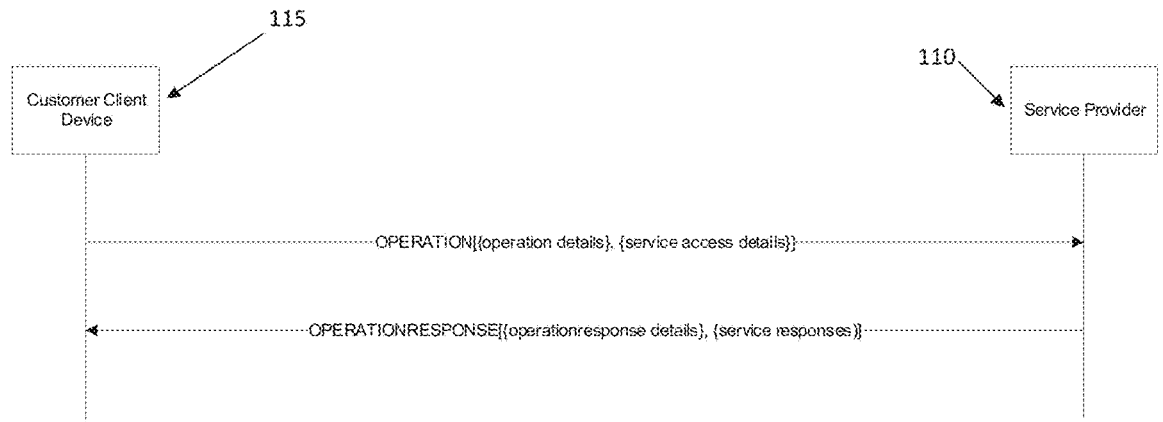
FIG. 3A illustrates a client/service-to-service message exchange in accordance with additional exemplary embodiments of the disclosure.

Therefore, in accordance with an aspect of the exemplary embodiment, a client/service-to-service message exchange model is established, as shown in FIG. 3A, where details of a list of available services (0..n) is made available from a client invoked message (service access details). Although the message exchange in FIG. 3A conforms to a traditional request/response exchange, the client device 115 passes access to known client services in a notification exchange.

Figure 3B:
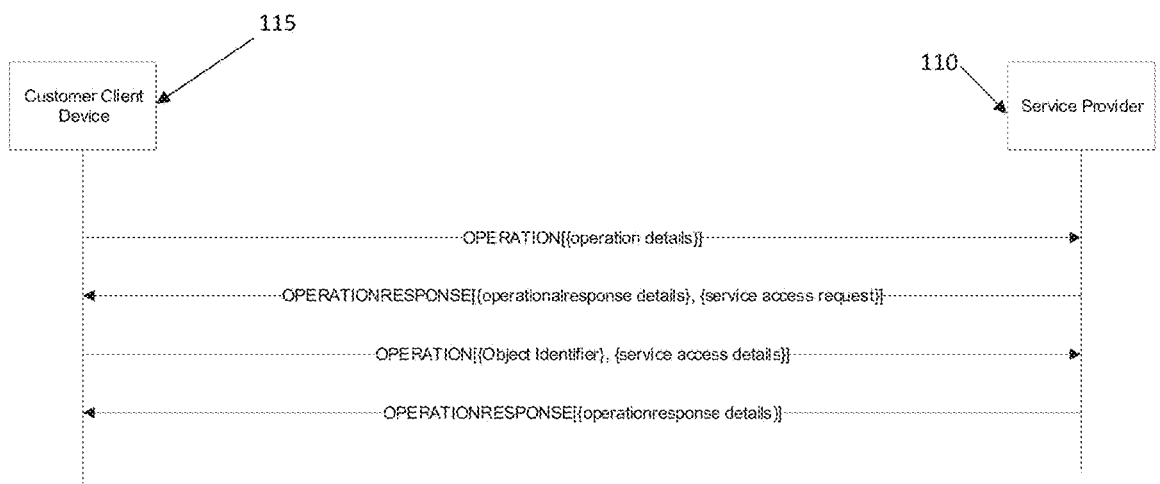
FIG. 3B illustrates an alternative client/service-to-service message exchange in accordance with additional exemplary embodiments of the disclosure.

According to the alternative message exchange model of FIG. 3B, service access details are requested from the client device 115 using a response message for the initial request operation request from the client. However, the alternative model of FIG. 3B is not preferred over that of FIG. 3A due to the amount of message exchange and implementation required at the customer client device 115.

The message exchange models of FIGS. 3A and 3B can be implemented using representational state transfer (REST) or RESTful web services, which is an open standard protocol format that allows requesting systems to access and manipulate web resources using a uniform and predefined set of stateless operations. Thus, a person of skill in the art will understand that RESTful web services can be used on a SaaS based collaboration service to allow all customer generated data to be returned to the customer client device 115 once the collaboration service has been terminated.

Returning to FIG. 2, customer registration begins with administrator 200 accessing admin portal 210 (which can be a hybrid portal) and entering customer information, such as personal and/or financial information, along with details of the secure storage 130 owned or under control of the customer, to which the service provider pushes the customer data (i.e. data pertaining to the customer as well as customer created content) on termination of service. The web server 230 then stores the customer information and details of secure storage 130 in networkable storage 220 (e.g at least one persistent storage) associated with the service provider 110.

The minimal data typically required to identify the secure storage 130 includes: the network storage location of storage 130 (e.g. a FQDN or IP Address); file transfer protocol to be used when transferring data to secure storage 130; and the authorization method and details (e.g. Basic Authentication or an Oauth 2.0).

In some implementations, the web server 230 may template the minimal data based on a known storage service in which case only the authorization method and details are required data to be provided by the administrator 200.

As shown in FIG. 2, once the administrator 200 has entered all the required data via the portal 210, the admin web application running on the portal performs an HTTP POST for a "createuser" operation to the customer endpoint in order to create a local customer on the service provider 110. In the body of the POST, details of the customer (userdetails) are included along with a list of available services which the service provider can gain access to that belong to the customer (serviceaccessdetail). The serviceaccessdetail typically define the type of service and specific details around the service. In the illustrated embodiment, the service is networkable storage and the details of the service is the minimal data required to identify the secure storage 130. As discussed above, customer data and service access information are stored in networkable storage 220. Once the customer has been successfully registered, the web server 230 sends a HTTP Response of OK back to the admin portal 210 to indicate success. The admin portal 210, in turn, provides an appropriate success indication to the administrator 200, thereby establishing the trust relationship between the customer and service provider 110.

A person of skill in the art will understand that the coordination of services is performed by orchestrator 140 which is a workflow automation software product that allows the administrator 200 to automate the monitoring and deployment of data center resources using APIs, wherein orchestration and choreography are provided by orchestrator 140 as a central service that orchestrates by pushing out operations to the various services (i.e. SaaS providers 120) in a transactional manner, and choreographs by pushing events on a bus that the various services listen on, in response to which the services act.

Figure 4:
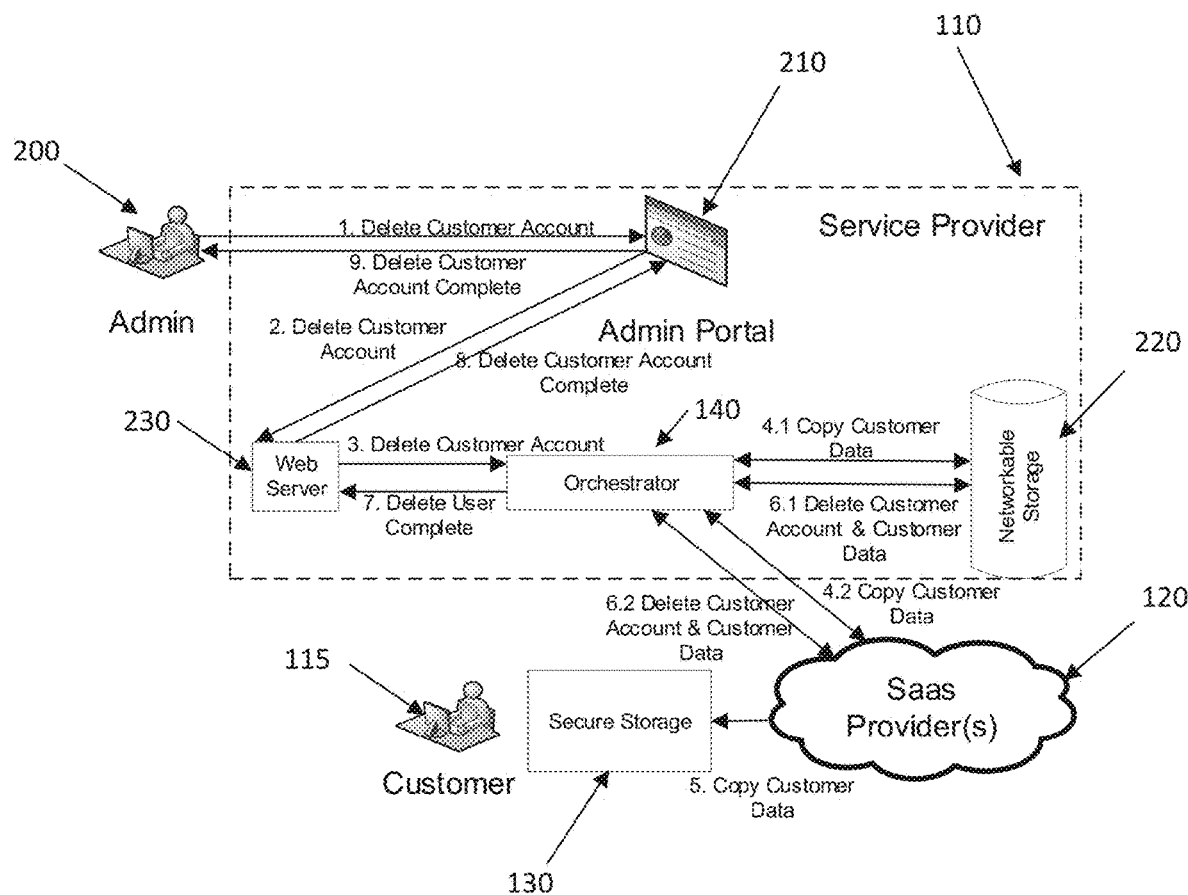
FIG. 4 illustrates a system that includes an orchestrator for deleting a customer from the centrally hosted service of FIG. 1, including copying of all customer data from the service provider and collaborative SaaS providers to the trusted storage in accordance with additional exemplary embodiments of the disclosure.
Figure 5:
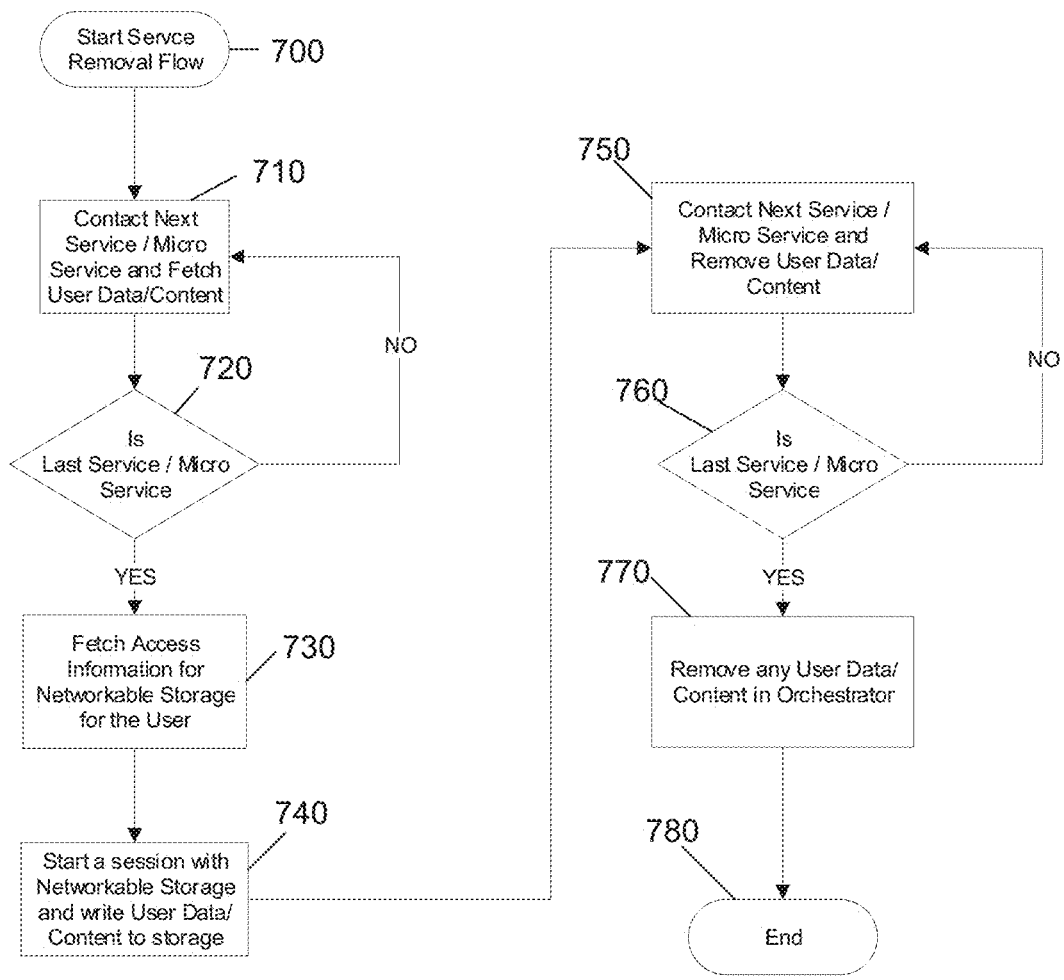
FIG. 5 is a flowchart showing an exemplary method of operation of the orchestrator set forth in FIG. 4.

As discussed above, upon termination of service, all customer generated data is returned to the customer, according to the system and method of FIGS. 4 and 5. Termination of service begins with the administrator 200 initiating a delete customer command via the admin portal 210. This causes web server 230 to invoke a sequence of delete user operations with the SaaS provider(s) 120 to copy all customer data to the customer owned or controlled secure storage 130, as described in greater detail below. The delete customer operations are performed by a orchestrator 140. Each SaaS provider 120 includes an orchestrator that communicates with service provider orchestrator 140 to ensure all content created by the customer to be deleted is collected and ready for transmission to the storage 130. Once the data is successfully transmitted to the secure storage 130, the orchestrator 140 removes the customer and all customer data from the SaaS service's persistent storage. As shown in FIG. 5, the orchestrator 140 communicates with all of the services and micro services (SaaS providers 120) that manage pieces of the customer's content and collects the data. Then, the orchestrator 140 uses the write-only account specified in the serviceaccessdetail during customer registration to identify the secure storage 130.

Once all data has been pushed to the secure storage 130, the orchestrator 140 removes all data content for the customer, including the information for accessing the secure storage 130. The administrator 200 then receives a notification of the success or failure of the delete operation.

FIG. 5 is an exemplary method showing operation of the orchestrator 140 in a SOA or micro service environment. The example method of FIG. 4 can be extended to a monolithic implementation (i.e. a single monolithic process) governed by a service-level agreement (SLA), as an alternative to orchestration via service-oriented architectures (SOAs) or micro-services.

Customer service removal begins at step 700. At step 710, customer data from the current SaaS provider 120 is fetched. If the current SaaS provider is not the last of all collaborative SaaS providers providing service to the customer (i.e. a "NO" response at step 720), then step 710 is repeated. Otherwise (i.e. a "YES" response at step 720), the access information for secure storage 130 is fetched from networkable storage 220 at step 730. At step 740, orchestrator 140 begins a secure session for writing all customer data to the secure storage 130.

For bulk operations involving simultaneous service removal for multiple customers, the loop between steps 720 and 710 would including fetching the content of multiple users, and step 740 would be modified in that the customer data for multiple users will be written to storage in the same network session.

At step 750, customer data from the current SaaS provider 120 is permanently deleted. If the current SaaS provider is not the last of all collaborative SaaS providers providing service to the customer (i.e. a "NO" response at step 760), then step 750 is repeated. Otherwise (i.e. a "YES" response at step 760), any customer data stored in the orchestrator 140 is permanently deleted at step 770. The orchestrator method then ends (step 780).

The methods and systems have been described above with reference to a number of exemplary embodiments and examples. It should be appreciated that the particular embodiments shown and described herein are illustrative of the invention and its best mode and are not intended to limit in any way the scope of the invention as set forth in the claims. It will be recognized that changes and modifications may be made to the exemplary embodiments without departing from the scope of the present invention. For example, while secure transfer of customer data has been described herein with respect to the scenario of termination of services to the customer in cloud-business architectures, it is contemplated that the principles set forth herein can be applied to standard customer backups in order to "escrow" the data to a trusted (and persistent) data storage location, including potential applications such as when an employee's data is part of a corporate bankruptcy, spinoff, merger/acquisition, etc. and the corporation decides to move the data to a neutral safe location while deleting the data from the originating service. Alternatively, it is contemplated that where, for example, service provider 110 provides backup services (e.g. cloud-based storage) upon termination of service the provider 110 may offer a secure storage for customer-directed needs since the customer data is already available within persistent storage 220.

These and other changes or modifications are intended to be included within the scope of the present invention, as expressed in the following claims.

What is claimed is:

1. A method of moving customer data relating to a service to a secure storage under control of the customer upon termination of the service governed by a service-level agreement (SLA), the method comprising:
    exchanging messages between a customer client device and a service provider for registering the customer for one or more services under control of an orchestrator;
    registering a trust relationship between the service provider and the customer for accessing secure storage under control of a customer;
    prior to termination of the one or more services, storing said customer data in at least one persistent storage associated with the service provider;
    initiating a delete customer command;
    fetching customer data from a current Software as a Service (SaaS) provider; and
    upon termination of the one or more services, using the orchestrator, copying the customer data from said at least one persistent storage to the secure storage under control of the customer and thereafter deleting the customer data from said at least one persistent storage,
    wherein the customer data from the current SaaS provider is permanently deleted, and
    wherein any customer data stored in the orchestrator is also permanently deleted.

2. The method of claim 1, wherein said messages are exchanged via a protocol that supports authorization workflows.

3. The method of claim 2, wherein exchanging messages includes the service provider transmitting a message to the customer client device that includes service access details relating to at least one client service available to the service provider.

4. The method of claim 3, wherein said at least one client service is networkable storage and said service access details include minimal data required to identify the secure storage.

5. The method of claim 4, wherein the minimal data includes a network storage location of the secure storage, a file transfer protocol for copying the customer data from said at least one persistent storage to the secure storage, and said protocol that supports authorization workflows.

6. The method of claim 1, wherein the service provider utilizes one of a one micro service, monolith or service-oriented architecture for providing said service such that the customer data is distributed between the service provider and at least one micro service, and further including copying customer data from the at least one micro service to the secure storage under control of the service provider upon termination of the service and thereafter deleting the customer data from the at least one micro service.

7. A system for moving customer data relating to a service to a secure storage under control of the customer upon termination of the service governed by a service-level agreement (SLA), the system comprising:
    a service provider for registering the customer for one or more of services under control of an orchestrator and at least one application, service, or microservice for receiving said customer data and providing said service, wherein the customer data is distributed between the service provider and said at least one application, service or microservice;
    at least one persistent storage associated with the service provider;
    the secure storage under control of the customer upon termination of the service; and
    a web server for storing said customer data in the at least one persistent storage and registering a trust relationship with the customer for accessing the secure storage under control of the customer,
    wherein a networkable storage comprises the at least one persistent storage,
    wherein the orchestrator copies customer data from the networkable storage to the secure storage upon termination of the service; and
    wherein, upon termination, the customer data from a current Software as a Service (SaaS) provider is permanently deleted, and wherein any customer data stored in the orchestrator is also permanently deleted.

8. The system of claim 7, wherein the web server registering a trust relationship with the secure storage includes exchanging messages between the web server and customer client device via a protocol that supports authorization workflows.

9. The system of claim 8, wherein exchanging messages includes the service provider transmitting a message to the customer client device that includes service access details relating to at least one client service available to the service provider.

10. The system of claim 9, wherein said at least one client service is the networkable storage and said service access details include minimal data required to identify the secure storage.

11. The system of claim 10, wherein the minimal data includes a network storage location of the secure storage, a file transfer protocol for copying the customer data from said at least one persistent storage to the secure storage, and said protocol that supports authorization workflows.

12. The system of claim 8, wherein the exchanging of messages uses representational state transfer (RESTful) web services.

13. A non-transient computer readable medium containing program instructions for causing a computer to perform the method governed by a service-level agreement (SLA) of:
    exchanging messages between a customer client device and a service provider for registering a customer for one or more services under control of an orchestrator;

registering a trust relationship between the service provider and the customer for accessing secure storage under control of a customer;

prior to termination of the one or more services, storing said customer data in at least one persistent storage associated with the service provider;

initiating a delete customer command;

fetching customer data from a current Software as a Service (SaaS) provider; and and upon termination of the one or more services, using the orchestrator, copying the customer data from said at least one persistent storage to the secure storage and thereafter deleting the customer data from said at last one persistent storage, wherein the customer data from the current SaaS provider is permanently deleted, and wherein any customer data stored in the orchestrator is also permanently deleted.

\* \* \* \* \*